US010444185B2

(12) United States Patent
Ikeda et al.

(10) Patent No.: US 10,444,185 B2
(45) Date of Patent: Oct. 15, 2019

(54) MASS SPECTROMETER AND MASS SPECTROMETRY METHOD

(71) Applicant: SHIMADZU CORPORATION, Kyoto-shi, Kyoto (JP)

(72) Inventors: Atsushige Ikeda, Kyoto (JP); Tohru Shiohama, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/092,466

(22) PCT Filed: Apr. 11, 2016

(86) PCT No.: PCT/JP2016/061688
§ 371 (c)(1),
(2) Date: Oct. 10, 2018

(87) PCT Pub. No.: WO2017/179096
PCT Pub. Date: Oct. 19, 2017

(65) Prior Publication Data

US 2019/0170688 A1 Jun. 6, 2019

(51) Int. Cl.
*G01N 27/62* (2006.01)
*H01J 49/00* (2006.01)
*H01J 49/40* (2006.01)

(52) U.S. Cl.
CPC .......... *G01N 27/62* (2013.01); *H01J 49/0031* (2013.01); *H01J 49/40* (2013.01)

(58) Field of Classification Search
CPC .... G01N 27/62; G01N 27/622; G01N 27/624; H01J 49/0027; H01J 49/0031; H01J 49/40
See application file for complete search history.

(56) References Cited

U.S. PATENT DOCUMENTS 9,514,360 B2 * 12/2016 Gardner ............. G06K 9/00543
2011/0101221 A1 * 5/2011 Mukaibatake ...... H01J 49/4215 250/292
2011/0282587 A1 * 11/2011 Jones .................. H01J 49/0009 702/19

FOREIGN PATENT DOCUMENTS

JP 2015-121500 A 7/2015
JP 2015121500 A * 7/2015

OTHER PUBLICATIONS

International Search Report of PCT/JP2016/061688 dated Jun. 21, 2016 [PCT/ISA/210].

* cited by examiner

*Primary Examiner* — David E Smith
(74) *Attorney, Agent, or Firm* — Sughrue Mion, PLLC

(57) ABSTRACT

A reference value selection unit selects a reference value that lies in a predetermined margin from reference sample data corresponding to a set reference sample. A data acquisition unit acquires mass spectrum data in a data acquisition range including a set analysis range and the margin. A data correction unit corrects the mass spectrum data based on the reference value and a measured value on the reference sample in the data acquisition range. When no reference value lies in the margin, the reference value selection unit selects a reference value that lies outside the analysis range but closest to the margin. The data acquisition unit acquires mass spectrum data in a data acquisition range expanded to allow the reference value to lie in the data acquisition range. The data correction unit corrects the mass spectrum data based on the reference value and the measured value in the data acquisition range.

10 Claims, 4 Drawing Sheets

MASS SPECTROMETER AND MASS SPECTROMETRY METHOD

CROSS REFERENCE TO RELATED APPLICATIONS

This application is a National Stage of International Application No. PCT/JP2016/061688, filed Apr. 11, 2016.

TECHNICAL FIELD

The present invention relates to a mass spectrometer that performs mass spectrometry analysis on a to-be-measured sample including a reference sample, the reference sample having a known reference value of a mass-to-charge ratio of a peak obtained through mass spectrometry analysis, and further relates to a mass spectrometry method for performing the mass spectrometry analysis.

BACKGROUND ART

Conventionally, mass spectrometers having an ability to perform mass spectrometry analysis on a to-be-measured sample including a reference sample with high accuracy have been used.

Specifically, in such a mass spectrometer, a sample having a known reference value of a mass-to-charge ratio of a peak obtained through mass spectrometry analysis is used as a reference sample. In the mass spectrometer, mass spectrometry analysis is performed on a to-be-measured sample including a reference sample, thereby generating mass spectrum data. Next, an actual measured value of a mass-to-charge ratio of a peak of the reference sample included in the mass spectrum data is detected, and a deviation (error) caused in the analysis operation is calculated as a correction value by comparison between the actual measured value and the reference value. Then, the mass spectrum data is corrected based on the correction value, thereby generating accurate mass spectrum data. A user causes analysis to be performed based on such corrected mass spectrum data to achieve analysis with high accuracy (see, for example, Patent Document 1 below).

In a case where such a mass spectrometer is used, the user presets a mass-to-charge ratio range corresponding to an analysis range. Then, the mass spectrometer generates (acquires) mass spectrum data in the mass-to-charge ratio range thus set.

PRIOR ART DOCUMENT

Patent Document

Patent Document 1: JP 2015-121500 A

SUMMARY OF THE INVENTION

Problems to be Solved by the Invention

The conventional mass spectrometer as described above causes inconvenience that the user is required to make the setting of the mass-to-charge ratio range corresponding to the analysis range in consideration of peaks of the reference sample obtained through mass spectrometry analysis. Specifically, for the mass spectrometer, in order to correct the mass spectrum data as described above, the mass spectrum data needs to include the peaks of the reference sample. This requires the user to confirm in advance values of mass-to-charge ratios of the peaks of the reference sample obtained through mass spectrometry analysis and to set the analysis range to cause the values to lie in the analysis range. In addition, when the values of the mass-to-charge ratios of the peak of the reference sample obtained through mass spectrometry analysis lie far away from the mass-to-charge ratio range required for the analysis, mass spectrum data unnecessary for the analysis is generated in a large amount, which further causes inconvenience that the overall analysis time increases.

The present invention has been made in view of the above circumstances, and an object of the present invention is to provide a mass spectrometer and a mass spectrometry method that allow work for correcting mass spectrum data to be performed more efficiently.

Means for Solving the Problems (1) A mass spectrometer according to the present invention performs mass spectrometry analysis on a to-be-measured sample including a reference sample, the reference sample having a known reference value of a mass-to-charge ratio of a peak obtained through mass spectrometry analysis. The mass spectrometer includes an analysis range setting reception unit, a storage unit, a reference value selection unit, a mass spectrometry unit, and a data acquisition unit. The analysis range setting reception unit receives a setting of a mass-to-charge ratio range corresponding to an analysis range of mass spectrometry analysis. The storage unit stores, in advance, reference values of mass-to-charge ratios of a plurality of peaks obtained through mass spectrometry analysis performed on the reference sample. The reference value selection unit reads the reference values of the mass-to-charge ratios of the plurality of peaks from the storage unit and selects a reference value of a mass-to-charge ratio of a specific peak from among the reference values. The mass spectrometry unit performs mass spectrometry analysis on the to-be-measured sample including the reference sample. The data acquisition unit acquires mass spectrum data obtained through mass spectrometry analysis on the to-be-measured sample in a data acquisition range including the mass-to-charge ratio range whose setting has been received by the analysis range setting reception unit and a margin provided adjacent to both ends of the mass-to-charge ratio range. The reference value selection unit selects a reference value of a mass-to-charge ratio of a peak that lies in a range of the margin from the reference values of the mass-to-charge ratios of the plurality of peaks stored in the storage unit. When no reference value of a mass-to-charge ratio of a peak lies in the range of the margin, the reference value selection unit selects a reference value of a mass-to-charge ratio of a peak that lies outside the analysis range but closest to the range of the margin. When no reference value of a mass-to-charge ratio of a peak lies in the range of the margin, the data acquisition unit acquires mass spectrum data obtained through mass spectrometry analysis on the to-be-measured sample in a data acquisition range in which the margin is expanded to allow the reference value selected by the reference value selection unit to lie in the data acquisition range.

According to such a configuration, when the user sets the mass-to-charge ratio range corresponding to the analysis range, the reference value selection unit reads the reference values of the mass-to-charge ratios of the plurality of peaks from the storage unit and selects a reference value of a mass-to-charge ratio of a specific peak from among the reference values. Specifically, the reference value selection unit selects a reference value of a mass-to-charge ratio of a peak that lies in the range of the margin from among the mass-to-charge ratios of the plurality of peaks stored in the storage unit. The data acquisition unit acquires mass spectrum data in a data acquisition range including the mass-to-charge ratio range thus set and the margin.

When no reference value of a mass-to-charge ratio of a peak that lies in the range of the margin, the reference value selection unit selects the reference value of the mass-to-charge ratio of the peak that lies outside the analysis range but closest to the range of the margin. The data acquisition unit acquires mass spectrum data in a data acquisition range in which the margin is expanded to allow the reference value thus selected to lie in the data acquisition range.

This configuration allows the user to simply set the mass-to-charge ratio range required for analysis as an analysis range without considering the peaks of the reference sample obtained through mass spectrometry analysis, which facilitates user's work.

This configuration further allows acquisition of mass spectrum data that lies in a minimum range required for correction of the mass spectrum data.

Therefore, acquisition of a large amount of mass spectrum data unnecessary for analysis is suppressed, which in turn suppresses an increase in a total data amount and analysis time.

That is, the mass spectrometer according to the present invention allows the work for correcting the mass spectrum data to be performed more efficiently.

(2) The mass spectrometer may further include a data correction unit. The data correction unit corrects the mass spectrum data in the data acquisition range acquired by the data acquisition unit, the mass spectrum data being corrected based on the reference value of the mass-to-charge ratio of the specific peak selected by the reference value selection unit and an actual measured value of a mass-to-charge ratio that corresponds to the specific peak and lies in the data acquisition range.

Such a configuration allows the data correction unit to correct the mass spectrum data with high accuracy.

(3) The mass spectrometer may further include a reference sample setting reception unit. The reference sample setting reception unit receives a setting of a type of reference sample. The mass spectrometry unit may perform mass spectrometry analysis on a to-be-measured sample including the reference sample whose setting has been received by the reference sample setting reception unit. The storage unit may store, in advance, reference values of mass-to-charge ratios of a plurality of peaks obtained through mass spectrometry analysis on each of a plurality of types of reference samples, the reference values being associated with a corresponding one of the plurality of types of reference samples. The reference value selection unit may read the reference values of the mass-to-charge ratios of the plurality of peaks associated with the reference sample whose setting has been received by the reference sample setting reception unit from the storage unit, and select a reference value of a mass-to-charge ratio of a specific peak from among the reference values.

According to such a configuration, when one reference sample is selected from the plurality of types of reference samples and set by the user, the reference sample setting reception unit receives the setting. The reference value selection unit reads, from the storage unit, the reference values of the mass-to-charge ratios of the plurality of peaks associated with the reference sample thus set, and selects the reference value of the mass-to-charge ratio of the specific peak from the reference values.

This configuration allows the user to simply select and set a type of reference sample without considering the peaks of the reference sample obtained through mass spectrometry analysis, which facilitates user's work.

(4) The reference value selection unit may further select reference values of mass-to-charge ratios of at least two peaks.

Such a configuration allows mass spectrum data to be corrected based on the reference values of the mass-to-charge ratios of at least two peaks, which allows mass spectrum data to be corrected with higher accuracy.

(5) The reference value selection unit may further select reference values of mass-to-charge ratios of at least one peak that lies in each of regions adjacent to both sides of the analysis range.

Such a configuration allows mass spectrum data to be corrected with higher accuracy.

(6) In accordance with a mass spectrometry method according to the present invention, mass spectrometry analysis is performed on a to-be-measured sample including a reference sample, the reference sample having a known reference value of a mass-to-charge ratio of a peak obtained through mass spectrometry analysis. The mass spectrometry method includes an analysis range setting step, a reference value selection step, a mass spectrometry analysis step, and a data acquisition step. In the analysis range setting step, a mass-to-charge ratio range corresponding to an analysis range of mass spectrometry analysis is set. In the reference value selection step, from a storage unit storing, in advance, reference values of mass-to-charge ratios of a plurality of peaks obtained through mass spectrometry analysis performed on the reference sample, the reference values of the mass-to-charge ratios of the plurality of peaks are read, and then a reference value of a mass-to-charge ratio of a specific peak is selected from the reference values. In the mass spectrometry analysis step, mass spectrometry analysis is performed on the to-be-measured sample including the reference sample. In the data acquisition step, mass spectrum data obtained through mass spectrometry analysis on the to-be-measured sample is acquired in a data acquisition range including the mass-to-charge ratio range set in the analysis range setting step and a margin provided adjacent to both ends of the mass charge ratio range. In the reference value selection step, a reference value of a mass-to-charge ratio of a peak that lies in a range of the margin is selected from the reference values of the mass-to-charge ratios of the plurality of peaks stored in the storage unit. When no reference value of a mass-to-charge ratio of a peak lies in the range of the margin, a reference value of a mass-to-charge ratio of a peak that lies outside the analysis range but closest to the range of the margin is selected. In the data acquisition step, when no reference value of a mass-to-charge ratio of a peak lies in the range of the margin, mass spectrum data obtained through mass spectrometry analysis on the to-be-measured sample is acquired in a data acquisition range in which the margin is expanded to allow the reference value selected in the reference value selection step to lie in the data acquisition range.

(7) The mass spectrometry method may further include a data correction step. In the data correction step, the mass spectrum data in the data acquisition range acquired in the data acquisition step is corrected based on the reference value of the mass-to-charge ratio of the specific peak selected in the reference value selection step and an actual measured value of a mass-to-charge ratio that corresponds to the specific peak and lies in the data acquisition range.

(8) The mass spectrometry method may further include a reference sample setting step. In the reference sample setting step, a type of reference sample is set. In the mass spectrometry analysis step, mass spectrometry analysis may be performed on a to-be-measured sample including the reference sample set in the reference sample setting step. In the reference value selecting step, from the storage unit storing, in advance, reference values of mass-to-charge ratios of a plurality of peaks obtained through mass spectrometry analysis performed on each of the plurality of types of reference samples, the reference values being associated with a corresponding one of the plurality of types of reference samples, the reference values of the mass-to-charge ratios of the plurality of peaks associated with the reference sample set in the reference sample setting step are read, and then a reference value of a mass-to-charge ratio of a specific peak may be selected from the reference values.

(9) Further, in the reference value selecting step, reference values of mass-to-charge ratios of at least two peaks may be selected.

(10) Further, in the reference value selection step, reference values of mass-to-charge ratios of at least one peak that lies in each of regions adjacent to both sides of the analysis range may be selected.

Effects of the Invention

The present invention allows the user to simply set the mass-to-charge ratio range required for analysis as an analysis range without considering the peaks of the reference sample obtained through mass spectrometry analysis, which facilitates user's work. This configuration further allows acquisition of mass spectrum data that lies in a minimum range required for correction of the mass spectrum data. This allows work for correcting the mass spectrum data to be performed more efficiently.

MODE FOR CARRYING OUT THE INVENTION

1. Configuration of Mass Spectrometer

Figure 1:
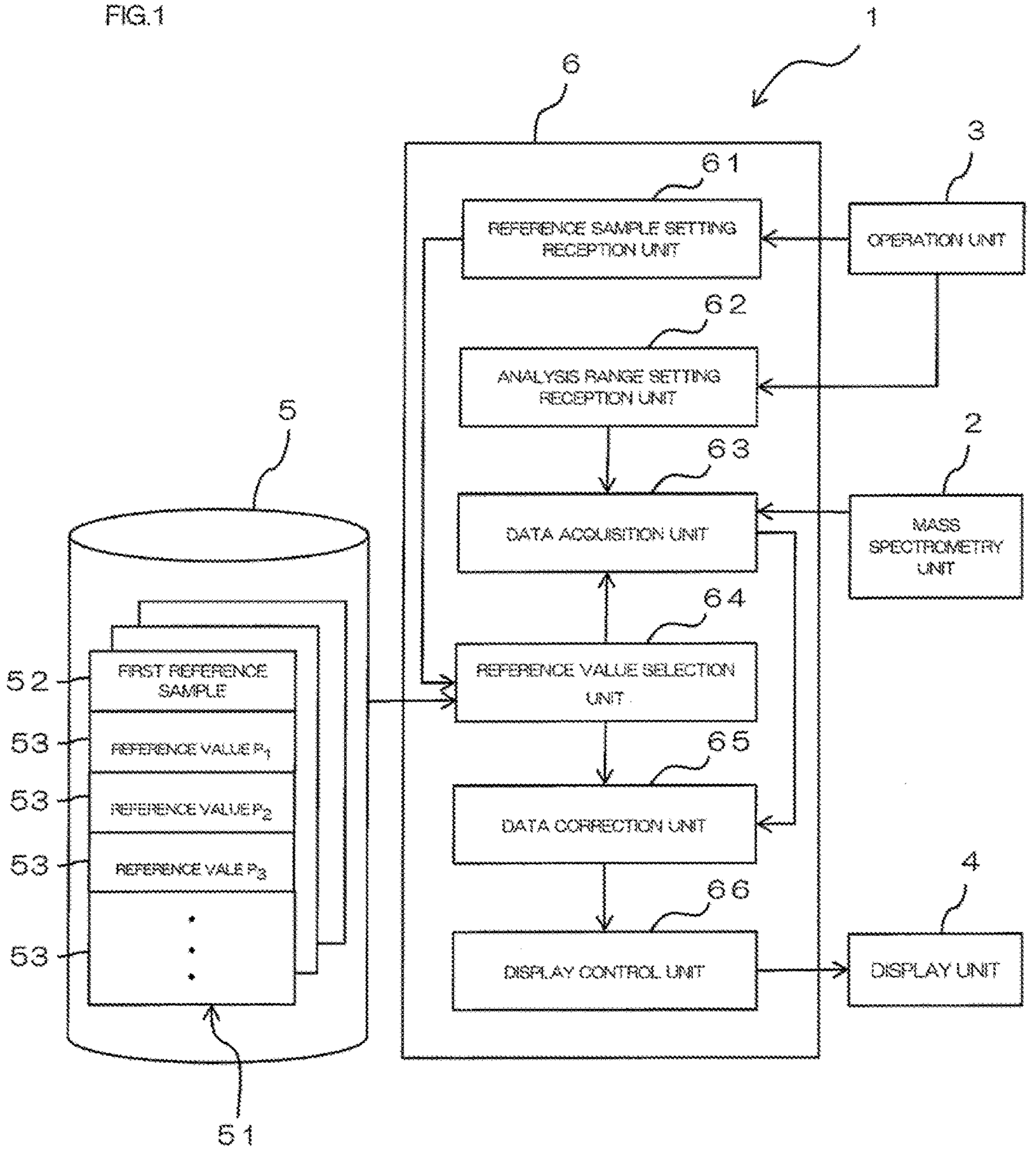
FIG. 1 is a block diagram showing a specific configuration of a mass spectrometer according to an embodiment of the present invention.

FIG. 1 is a block diagram showing a specific configuration of a mass spectrometer 1 according to an embodiment of the present invention.

The mass spectrometer 1 is a device that performs mass spectrometry analysis on a to-be-measured sample including a reference sample (internal standard). The mass spectrometer 1 includes a mass spectrometry unit 2, an operation unit 3, a display unit 4, a storage unit 5, and a control unit 6.

The mass spectrometry unit 2 includes, for example, an ionization chamber and a time-of-flight mass spectrometer (TOFMS) (not shown). The to-be-measured sample is supplied to the ionization chamber to be ionized by ionization technique such as matrix assisted laser desorption/ionization (MALDI). Note that the ionization technique for ionizing sample components is not limited to the MALDI, and other various techniques can be used.

In the TOFMS, an ion detector (not shown) detects ions flying in a flight space. Specifically, ions accelerated by an electric field formed in the flight space are temporally separated in accordance with mass-to-charge ratios of the ions while flying in the flight space, and are sequentially detected by the ion detector. As a result, a relationship between a mass-to-charge ratio (m/z value) and an intensity detected by the ion detector is measured as a spectrum. In this manner, mass spectrometry analysis is performed.

The operation unit 3 includes, for example, a keyboard and a mouse. A user can operate the operation unit 3 to input various pieces of information such as an analysis condition (setting) to the control unit 6.

The display unit 4 includes, for example, a liquid crystal display. The display unit 4 displays various pieces of information such as an analysis result under control of the control unit 6.

The storage unit 5 includes, for example, a read only memory (ROM), a random access memory (RAM), a hard disk, and the like. The storage unit 5 stores a plurality of pieces of reference sample data 51.

Each of the pieces of reference sample data 51 corresponds to a piece of data on a reference sample usable in mass spectrometry analysis and is provided in accordance with a corresponding type of reference sample. In each of the pieces of reference sample data, index data 52 and a plurality of pieces of reference value data 53 are associated with each other.

The index data 52 is data used for identification of a type of reference sample. The index data 52 corresponding to an index used for selection of one of the plurality of pieces of reference sample data 51.

Each of the pieces of reference value data 53 corresponds to information on a reference value of a mass-to-charge ratio of a peak obtained through mass spectrometry analysis performed on a reference sample. Specifically, when reference samples undergo mass spectrometry analysis, a plurality of peaks are obtained for each of the reference samples. The pieces of reference value data 53 correspond to information on reference values of mass-to-charge ratios of peaks for each reference sample. The number of the pieces of reference value data 53 included in each of the pieces of reference sample data 51 varies depending on a type of reference sample, but in this example, the number is at least two.

The control unit 6 includes, for example, a central processing unit (CPU). The control unit 6 is capable of receiving or sending electric signals from or to the mass spectrometry unit 2, the operation unit 3, and the display unit 4. The control unit 6 reads information stored in the storage unit 5 as necessary. A program executed by the CPU causes the control unit 6 to function as a reference sample setting reception unit 61, an analysis range setting reception unit 62, a data acquisition unit 63, a reference value selection unit 64, a data correction unit 65, a display control unit 66, and the like.

The reference sample setting reception unit 61 receives a setting of a type of reference sample input to the operation unit 3. Note that such a type of reference sample corresponds to a type of reference sample data 51 stored in the storage unit 5.

The analysis range setting reception unit 62 receives a setting of an analysis range input to the operation unit 3. Specifically, the analysis range setting reception unit 62 receives a setting of a mass-to-charge ratio range as a range in which analysis is performed.

The data acquisition unit 63 acquires (generates) mass spectrum data based on a result of mass spectrometry analysis performed by the mass spectrometry unit 2 and the mass-to-charge ratio range whose setting has been received by the analysis range setting reception unit 62. Specifically, the data acquisition unit 63 acquires mass spectrum data obtained through mass spectrometry analysis performed by the mass spectrometry unit 2 in a range including the mass-to-charge ratio range whose setting has been received by the analysis range setting reception unit 62 and a margin added to the mass-to-charge ratio range. The margin corresponds to a region that results from taking into consideration an error (deviation) in the acquired data, the error caused in the analysis operation and is provided for expanding the analysis range (mass-to-charge ratio range) to allow data including the error to be acquired. Further, the margin corresponds to a region provided for expanding the analysis range (mass-to-charge ratio range) to allow data lying near a boundary of the mass-to-charge ratio range whose setting has been received by the analysis range setting reception unit 62 to be correctly acquired. As will be described in detail later, this margin is determined based on selection contents of the reference value selection unit 64.

The reference value selection unit 64 reads the plurality of pieces of reference value data 53 from the pieces of reference sample data 51 stored in the storage unit 5 and selects a specific piece of reference value data 53 from among the pieces of reference value data 53. Specifically, the reference value selection unit 64 selects, from storage unit 5, a value (reference value) of a designated piece of reference value data 53 associated with the reference sample whose setting has been received by the reference sample setting reception unit 61.

The data correction unit 65 corrects the mass spectrum data acquired by the data acquisition unit 63. Specifically, the data correction unit 65 corrects the mass spectrum data based on the reference value (reference value data 53) selected by the reference value selection unit 64 and an actual measured value of a peak of the reference sample included in the mass spectrum data.

The display control unit 66 causes the display unit 4 to display a mass spectrum based on the mass spectrum data corrected by the data correction unit 65.

2. Control Operation Performed by Control Unit

Figure 2:
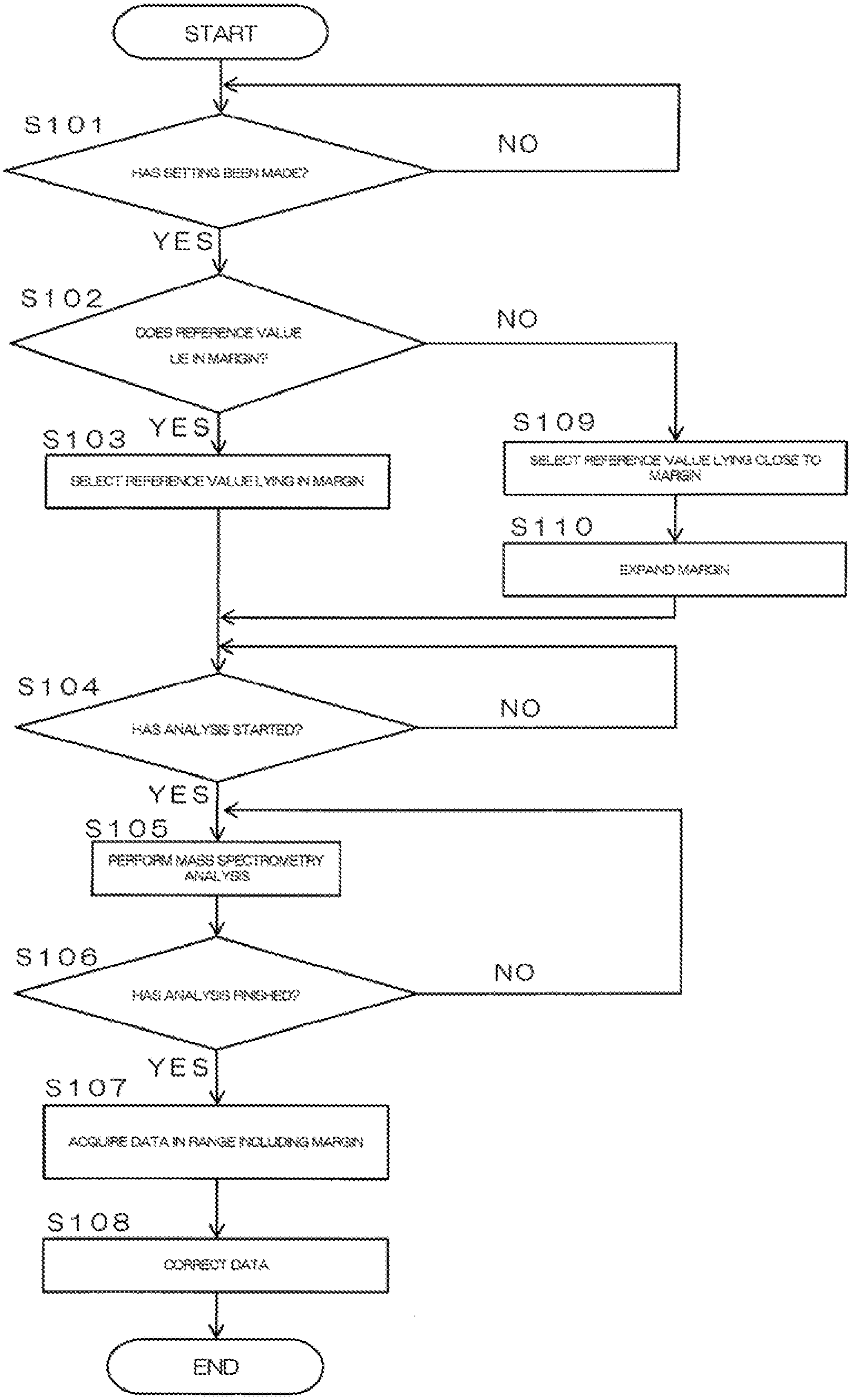
FIG. 2 is a flowchart showing an example of processing performed by a control unit.
Figure 3:
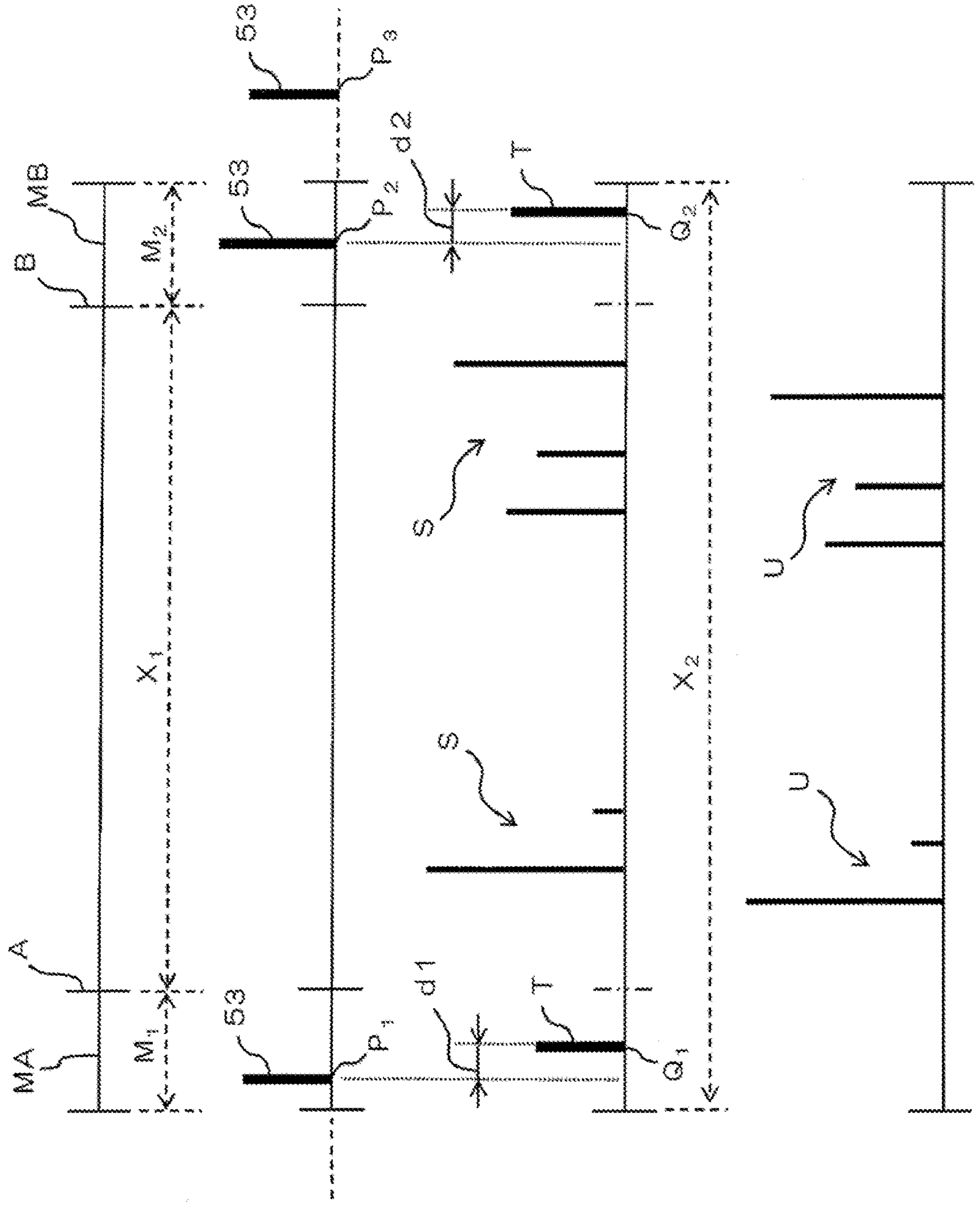
FIGS. 3(*a*) to 3(*d*) are diagrams schematically showing data that is processed by the control unit, more specifically, showing a series of data until corrected mass spectrum data is generated in a case where a value of a piece of reference value data stored in a storage unit lies in a range of a margin.

FIG. 2 is a flowchart showing an example of processing performed by the control unit 6. FIGS. 3(*a*) to 3(*d*) are diagrams schematically showing data that is processed by the control unit 6, more specifically, showing a series of data until the corrected mass spectrum data is generated in a case where a value of a piece of reference value data 53 stored in the storage unit 5 lies in the range of the margin. Note that, in each of FIGS. 3(*a*) to 3(*d*), a value of a mass-to-charge ratio is shown in a horizontal direction, and a value of signal intensity (a length in a vertical direction of a graph) is shown in the vertical direction.

Hereinafter, the control operation to be performed by the control unit 6 will be described with reference to the flowchart and the data schematic diagrams.

When using the mass spectrometer 1, a user first prepares a to-be-measured sample and a reference sample. The reference sample corresponds to a sample having a known reference value of a mass-to-charge ratio of a peak obtained through mass spectrometry analysis. In the storage unit 5, data on such usable reference samples is stored in advance as the reference sample data 51.

The user sets the to-be-measured sample including a sample and a reference sample into the mass spectrometry unit 2 and operates the operation unit 3 to set a type of the reference sample and an analysis range (YES in step S101). Specifically, the user operates the operation unit 3 to make a setting for specifying the reference sample set in the mass spectrometry unit 2 (reference sample setting step), and sets the mass-to-charge ratio range in which analysis is performed (analysis range setting step).

Then, the reference sample setting reception unit 61 receives the setting on the reference sample. Further, the analysis range setting reception unit 62 receives the setting on the mass-to-charge ratio range corresponding to the analysis range.

FIG. 3(*a*) shows a range including an analysis range $X_1$, and margins MA and MB provided adjacent to both ends of the analysis range $X_1$. The analysis range $X_1$ corresponds to the mass-to-charge ratio range received by the analysis range setting reception unit 62. For example, when a lower limit value A and an upper limit value B of the mass-to-charge ratio are set as the analysis range through the operation on the operation unit 3 performed by the user, a region from the lower limit value A to the upper limit value B corresponds to the analysis range $X_1$. In the mass spectrometer 1, respective widths of the margins MA and MB are predetermined. Then, in the mass spectrometer 1, based on the range including the analysis range $X_1$ and the margins MA and MB provided adjacent to both the ends of the analysis range $X_1$ (the range including the analysis range $X_1$, the margin MA provided adjacent to a front end of the analysis range $X_1$, and the margin MB provided adjacent to a rear end of the analysis range $X_1$), data is processed as described below.

Note that, in the following description, a region from the lower limit value A of the analysis range $X_1$ to a point (value) located forward by the margin MA is defined as a first margin region $M_1$, and a region from the upper limit value B of the analysis range $X_1$ to a point (value) located rearward by the margin MB is defined as a second margin region $M_2$.

The reference value selection unit 64 reads a piece of reference sample data 51 including the index data 52 indicating the reference sample from the storage unit 5, the piece of reference sample data 51 being associated with the reference sample whose setting has been received by the reference sample setting reception unit 61. When a piece of reference value data 53 indicating a reference value lying in the range of the margin is present in the pieces of reference value data 53 included in the piece of reference sample data 51, the reference value selection unit 64 selects the reference value (reference value selection step).

FIG. 3(*b*) shows pieces of reference value data 53 denoted as reference values $P_1$ to $P_3$ are superimposed on the data (range) shown in FIG. 3(*a*). Each of the reference values $P_1$ to $P_3$ corresponds to a value of a piece of reference value data 53 included in a piece of reference sample data 51 read from the storage unit 5 by the reference value selection unit 64.

Specifically, among the respective values (reference values $P_1$ to $P_3$) of the pieces of reference value data 53 included in the piece of reference sample data 51 read by the reference value selection unit 64, the reference value $P_1$ lies in the first margin region $M_1$, the reference value $P_2$ lies in the second margin region $M_2$, and the reference value $P_3$ lies in a region located behind the second margin region $M_2$.

In this example, since the reference value $P_1$ and the reference value $P_2$ lie in the first margin region $M_1$ and the second margin region $M_2$, respectively (YES in step S102), the reference value selection unit 64 selects the reference value $P_1$ and the reference value $P_2$ (step S103).

As described above, the reference value selection unit 64 selects at least two reference values from pieces of reference value data 53 included in a piece of reference sample data 51. Specifically, the reference value selection unit 64 selects reference values such that at least one reference value lies in each of regions adjacent to both sides (front side and back side) of the analysis range $X_1$.

Then, the user operates the operation unit 3 to cause the mass spectrometry unit 2 to start mass spectrometry analysis (YES in step S104). The mass spectrometry unit 2 starts the mass spectrometry analysis in response to the operation (step S105: mass spectrometry analysis step). Specifically, the mass spectrometry unit 2 ionizes a to-be-measured sample including a sample and a reference sample, causes ions thus obtained to fly in a flight space, and then detects the ions with an ion detector. Then, the mass spectrometry unit 2 measures a relationship between a mass-to-charge ratio and an intensity detected by the ion detector as a spectrum.

Upon completion of the mass spectrometry analysis performed by the mass spectrometry unit 2 (YES in step S106), the data acquisition unit 63 acquires mass spectrum data in a range including the analysis range and the margin. In this example, the reference value $P_1$ and the reference value $P_2$ lie in the first margin region $M_1$ and the second margin region $M_2$, respectively. Therefore, as shown in FIG. 3(*c*), the data acquisition unit 63 sets a range including the analysis range $X_1$, and the margins MA and MB provided adjacent to both ends of the analysis range $X_1$ as a data acquisition range $X_2$, and acquires mass spectrum data in this data acquisition range $X_2$ (step S107: data acquisition step), the mass spectrum data being obtained through mass spectrometry analysis performed by the mass spectrometry unit 2.

This mass spectrum data includes sample data S corresponding to data on the sample and actual measured data T corresponding to data of actual measured values on the reference sample. Values of mass-to-charge ratios of the actual measured data T are an actual measured value $Q_1$ and an actual measured value $Q_2$. The actual measured value $Q_1$ of the actual measured data T corresponds to the reference value $P_1$ of a piece of reference value data 53, and the actual measured value $Q_2$ of the actual measured data T corresponds to the reference value $P_2$ of a piece of reference value data 53.

The sample data S and the actual measured data T include a deviation (error) caused in the analysis operation. Therefore, the data correction unit 65 corrects the sample data S based on the reference value on the reference sample and the actual measured value on the reference sample. Specifically, a deviation d1 is present between the actual measured value $Q_1$ of the actual measured data T and the reference value $P_1$ of the piece of the reference value data 53. Further, a deviation d2 is present between the actual measured value $Q_2$ of the actual measured data T and the reference value $P_2$ of the piece of the reference value data 53. Therefore, the data correction unit 65 determines a correction value (correction expression) for correcting data based on the fact. Then, the data correction unit 65 applies the correction value to the sample data S to generate sample data U corresponding to corrected mass spectrum data as shown in FIG. 3(*d*) (step S108: data correction step).

Note that examples of the method for correcting the sample data S include a method in which a straight line based on the reference values and the actual measured values on the reference sample is created in an area with the reference value as the horizontal axis and the actual measured value as the vertical axis, and the sample data U is created based on the created straight line and the values of the sample data S (based on reference values corresponding to the sample data S on the created straight line), and another method of mass correction.

Then, the display control unit 66 causes the display unit 4 to display the corrected mass spectrum data (sample data U).

Figure 4:
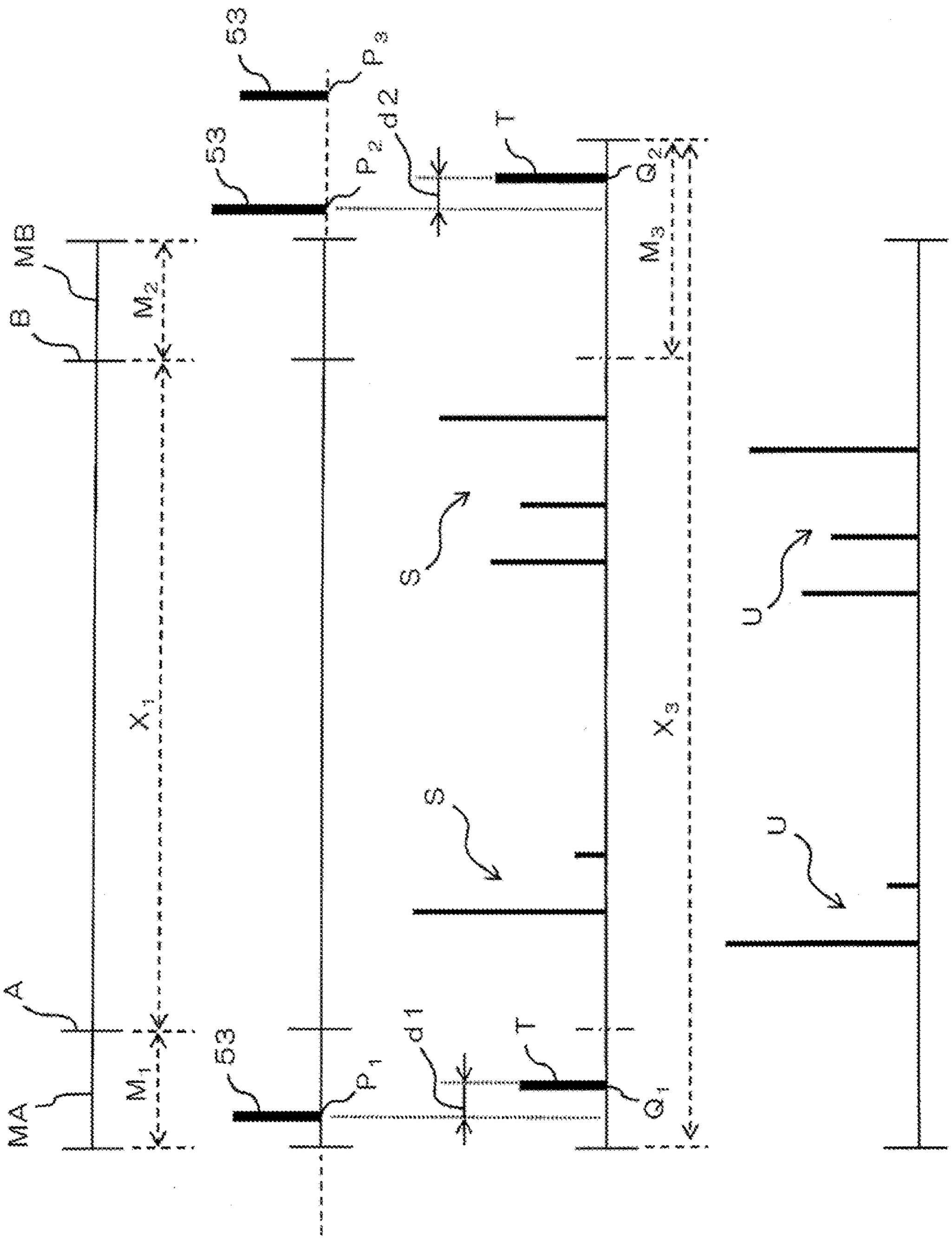
FIGS. 4(*a*) to 4(*d*) are diagrams schematically showing data that is processed by the control unit, more specifically, showing a series of data until corrected mass spectrum data is generated in a case where none of values of pieces of reference value data stored in the storage unit lies in the range of the margin.

On the other hand, when a determination in step S102 results in NO, that is, when no reference value lies in the range of the margin, mass spectrum data is generated as shown in FIGS. 4(*a*) to 4(*d*). FIGS. 4(*a*) to 4(*d*) are diagrams schematically showing data that is processed by the control unit 6, more specifically, showing a series of data until the corrected mass spectrum data is generated in a case where none of values of pieces of reference value data 53 stored in the storage unit 5 lies in the range of the margin. FIGS. 4(*a*) to 4(*d*) are different from FIGS. 3(*a*) to (*d*) in that, in FIG. 4(*b*), pieces of reference value data 53 of reference values $P_2$ and $P_3$ lie outside the second margin region $M_2$, and in FIG. 4(*c*), actual measured data T lies outside the second margin region $M_2$.

Specifically, when none of pieces of reference value data 53 included in a piece of reference sample data 51 read from the storage unit 5 lies in the range of the margin in step S102, the reference value selection unit 64 selects a reference value that lies outside the analysis range $X_1$ but closest to the margin (step S109). In this example, as shown in FIG. 4(*b*), none of the pieces of reference value data 53 lies in the second margin region $M_2$. Further, in this example, a piece of reference value data 53 corresponding to the reference value $P_2$ lies outside the analysis range $X_1$ and closest to the second margin region $M_2$.

Note that a piece of reference value data 53 corresponding to the reference value $P_1$ lies in the first margin region $M_1$. Therefore, as for the front side of the analysis range $X_1$, the reference value selection unit 64 selects the piece of reference value data 53 corresponding to the reference value $P_1$ as described above.

Then, the data acquisition unit 63 expands the margin adjacent to both ends of the analysis range $X_1$ to allow the reference value thus selected to lie in the margin.

In this example, as shown in FIG. 4(*c*), none of pieces of reference value data 53 lies in the second margin region $M_2$. Therefore, the data acquisition unit 63 provides (generates) a third margin region $M_3$ adjacent to the rear side of the analysis range $X_1$ to allow the piece of reference value data 53 corresponding to the reference value $P_2$ to lie in the third margin region $M_3$. On the other hand, a piece of reference value data 53 corresponding to the reference value $P_1$ lies in the first margin region $M_1$. Therefore, the data acquisition unit 63 provides the first margin region $M_1$ adjacent to the front side of the analysis range $X_1$ in the same manner as described above.

Thereafter, in the same manner as described above, mass spectrometry analysis in the mass spectrometry unit 2 is started based on the operation on the operation unit 3 performed by the user. Then, the data acquisition unit 63 sets a range including the analysis range $X_1$ and margin regions provided adjacent to both sides of the analysis range $X_1$ (the first margin region $M_1$ and the third margin region $M_3$) as a data acquisition range $X_3$, and acquires mass spectrum data obtained through mass spectrometry analysis performed in this data acquisition range $X_3$ by the mass spectrometry unit 2. In the same manner as described above, sample data U corresponding to corrected mass spectrum data is generated by the data correction unit 65, and the display control unit 66 causes the display unit 4 to display the corrected mass spectrum data (sample data U).

3. Effects (1) In the present embodiment, when the mass-to-charge ratio range corresponding to the analysis range is set by the user (setting step), the reference value selection unit 64 reads a piece of reference sample data 51 from the storage unit 5. When pieces of reference value data 53 indicating reference values that lie in the range of the margin are present in the pieces of the reference value data 53 included in the piece of reference sample data 51 (YES in step S102), the reference value selection unit 64 selects the reference values (reference values $P_1$ and $P_2$). Further, as shown in FIG. 3(*c*), the data acquisition unit 63 acquires mass spectrum data in the data acquisition range $X_2$ including the mass-to-charge ratio range (analysis range $X_1$) thus set, and the margins MA and MB provided adjacent to both ends of the mass-to-charge ratio range. Then, as shown in FIG. 3(*d*), the data correction unit 65 corrects the mass spectrum data thus acquired based on the reference values (reference values $P_1$ and $P_2$) thus selected and the actual measured values of the actual measured data T (actual measured values $Q_1$ and $Q_2$) in the data acquisition range $X_2$.

On the other hand, when a determination results in NO in step S102, that is, when no reference value lies in the range of the margin, the reference value selection unit 64 selects a reference value that lies outside the analysis range $X_1$ but closest to the margin (step S109). Then, as shown in FIG. 4(*c*), the data acquisition unit 63 acquires the mass spectrum data in the data acquisition range $X_3$ including the margin expanded to allow the reference value thus selected to lie in the data acquisition range $X_3$ (step S110).

This configuration allows the user to simply set the mass-to-charge ratio range required for analysis as an analysis range in the setting step without considering the values of the peaks of the reference sample obtained through mass spectrometry analysis, which facilitates user's work.

This configuration further allows acquisition of mass spectrum data in a minimum data acquisition range required for correction of the mass spectrum data.

Therefore, acquisition of a large amount of mass spectrum data unnecessary for analysis is suppressed, which in turn suppresses an increase in a total data amount and analysis time.

That is, the present embodiment allows work for correcting the mass spectrum data to be performed more efficiently.

(2) Further, in the present embodiment, the data correction unit 65 corrects the sample data S based on the reference value of the piece of reference value data 53 selected by the reference value selection unit 64 and the actual measured value of the actual measured data T in the analysis range. Specifically, the data correction unit 65 determines a correction value (correction expression) for correcting data based on the fact that the deviation d1 is present between the actual measured value $Q_1$ of the actual measured data T and the reference value $P_1$ of the piece of the reference value data 53, and that the deviation d2 is present between the actual measured value $Q_2$ of the actual measured data T and the reference value $P_2$ of the piece of the reference value data 53. Then, the data correction unit 65 applies the correction value to the sample data S to generate the sample data U corresponding to the corrected mass spectrum data (data correction step).

This configuration allows the data correction unit 65 to correct the sample data S with high accuracy.

(3) Further, in the present embodiment, when one reference sample selected from a plurality of types of reference samples is set by the user, the reference sample setting reception unit 61 receives the setting. The reference value selection unit 64 reads a piece of reference sample data 51 including the index data 52 indicating the reference sample from the storage unit 5, the piece of reference sample data 51 being associated with the reference sample whose setting has been received by the reference sample setting reception unit 61. Then, the reference value selection unit 64 selects a specific piece of reference value data 53 from pieces of the reference value data 53 included in the piece of reference sample data 51 (reference value selection step).

This configuration allows the user to simply select and set a type of reference sample without considering the peaks of the reference sample obtained through mass spectrometry analysis, which facilitates user's work.

(4) Further, in the present embodiment, as shown in FIGS. 3(*a*) to 3(*d*) and FIGS. 4(*a*) to 4(*d*), the reference value selection unit 64 selects at least two reference values from among the pieces of the reference value data 53 included in the piece of reference sample data 51 stored in the storage unit 5.

This configuration allows the data correction unit 65 to correct mass spectrum data based on the at least two reference values.

This in turn allows mass spectrum data to be corrected with higher accuracy.

(5) Further, in the present embodiment, as shown in FIGS. 3(*a*) to 3(*d*) and FIGS. 4(*a*) to 4(*d*), the reference value selection unit 64 selects reference values such that at least one reference value lies in each of regions adjacent to both sides (front side and back side) of the analysis range $X_1$.

This configuration allows mass spectrum data to be corrected with higher accuracy.

4. Modified Example

In the above-described embodiment, a description has been given of the configuration where the reference value selection unit 64 selects at least two reference values from among the pieces of reference value data 53 included in the piece of reference sample data 51 stored in the storage unit 5. However, the reference value selection unit 64 may select one reference value from among the pieces of reference value data 53 included in the piece of reference sample data 51 stored in the storage unit 5. Further, in this configuration, the reference value selection unit 64 may select a reference value such that one reference value lies in a region adjacent to either the front side or the back side of the analysis range.

DESCRIPTION OF REFERENCE SIGNS

1 mass spectrometer
2 mass spectrometry unit
5 storage unit
61 reference sample setting reception unit
62 analysis range setting reception unit
63 data acquisition unit
64 reference value selection unit
65 data correction unit

The invention claimed is:

1. A mass spectrometer configured to perform mass spectrometry analysis on a to-be-measured sample including a reference sample, the reference sample having a known reference value of a mass-to-charge ratio of a peak obtained through mass spectrometry analysis, the mass spectrometer comprising:

an analysis range setting reception unit configured to receive a setting of a mass-to-charge ratio range corresponding to an analysis range of mass spectrometry analysis;

a storage unit configured to store, in advance, reference values of mass-to-charge ratios of a plurality of peaks obtained through mass spectrometry analysis performed on a reference sample;

a reference value selection unit configured to read the reference values of the mass-to-charge ratios of the plurality of peaks from the storage unit and select a reference value of a mass-to-charge ratio of a specific peak from among the reference values thus read;

a mass spectrometry unit configured to perform mass spectrometry analysis on a to-be-measured sample including the reference sample; and a data acquisition unit configured to acquire mass spectrum data obtained through mass spectrometry analysis performed on the to-be-measured sample in a data acquisition range, the data acquisition range including the mass-to-charge ratio range whose setting has been received by the analysis range setting reception unit and a margin provided adjacent to both ends of the mass-to-charge ratio range, wherein the reference value selection unit selects a reference value of a mass-to-charge ratio of a peak that lies in a range of the margin from among the reference values of the mass-to-charge ratios of the plurality of peaks stored in the storage unit, and when no reference value of a mass-to-charge ratio of a peak lies in the range of the margin, the reference value selection unit selects a reference value of a mass-to-charge ratio of a peak that lies outside the analysis range but closest to the range of the margin from among the reference values of the mass-to-charge ratios of the plurality of peaks stored in the storage unit, and a data acquisition unit acquires, when no reference value of a mass-to-charge ratio of a peak lies in the range of the margin, mass spectrum data in a data acquisition range in which the margin is expanded to allow the reference value selected by the reference value selection unit to lie in the data acquisition range, the mass spectrum data being obtained through mass spectrometry analysis performed on the to-be-measured sample.

2. The mass spectrometer according to claim 1, further comprising a data correction unit configured to correct the mass spectrum data in the data acquisition range acquired by the data acquisition unit, the mass spectrum data being corrected based on the reference value of the mass-to-charge ratio of the specific peak selected by the reference value selection unit and an actual measured value of a mass-to-charge ratio that corresponds to the specific peak and lies in the data acquisition range.

3. The mass spectrometer according to claim 2, further comprising a reference sample setting reception unit configured to receive a setting of a type of reference sample, wherein the mass spectrometry unit performs mass spectrometry analysis on a to-be-measured sample that includes the reference sample whose setting has been received by the reference sample setting reception unit, the storage unit stores, in advance, reference values of mass-to-charge ratios of a plurality of peaks obtained through mass spectrometry analysis performed on each of a plurality of types of reference samples, the reference values being associated with a corresponding one of the plurality of types of reference samples, the reference value selection unit reads, from the storage unit, reference values of mass-to-charge ratios of a plurality of peaks associated with the reference sample whose setting has been received by the reference sample setting reception unit, and selects a reference value of a mass-to-charge ratio of a specific peak among from the reference values thus read.

4. The mass spectrometer according to claim 3, wherein the reference value selection unit selects reference values of mass-to-charge ratios of at least two peaks.

5. The mass spectrometer according to claim 4, wherein the reference value selection unit selects a reference value of a mass-to-charge ratio of at least one peak that lies in each of regions adjacent to both sides of the analysis range.

6. A mass spectrometry method for performing mass spectrometry analysis on a to-be-measured sample including a reference sample, the reference sample having a known reference value of a mass-to-charge ratio of a peak obtained through mass spectrometry analysis, the mass spectrometry method comprising:

an analysis range setting step of setting a mass-to-charge ratio range corresponding to an analysis range of mass spectrometry analysis;

a reference value selection step of reading, from a storage unit storing, in advance, reference values of mass-to-charge ratios of a plurality of peaks obtained through mass spectrometry analysis performed on a reference sample, the reference values of the mass-to-charge ratios of the plurality of peaks and selecting a reference value of a mass-to-charge ratio of a specific peak from among the reference values;

a mass spectrometry analysis step of performing mass spectrometry analysis on a to-be-measured sample including a reference sample; and a data acquisition step of acquiring mass spectrum data obtained through mass spectrometry analysis performed on the to-be-measured sample in a data acquisition range, the data acquisition range including the mass-to-charge ratio range set in the analysis range setting step and a margin provided adjacent to both ends of the mass-to-charge ratio range, wherein in the reference value selection step, a reference value of a mass-to-charge ratio of a peak that lies in a range of the margin is selected from among the reference values of the mass-to-charge ratios of the plurality of peaks stored in the storage unit, and when no reference value of a mass-to-charge ratio of a peak lies in the range of the margin, a reference value of a mass-to-charge ratio of a peak that lies outside the analysis range but closest to the range of the margin is selected from among the reference values of the mass-to-charge ratios of the plurality of peaks stored in the storage unit, and in the data acquisition step, when no reference value of a mass-to-charge ratio of a peak lies in the range of the margin, mass spectrum data is acquired in a data acquisition range in which the margin is expanded to allow the reference value selected in the reference value selection step to lie in the data acquisition range, the mass spectrum data being obtained through mass spectrometry analysis performed on the to-be-measured sample.

7. The mass spectrometry method according to claim 6 further comprising a data correction step of correcting the mass spectrum data in the data acquisition range acquired in the data acquisition step, the mass spectrum data being corrected based on the reference value of the mass-to-charge ratio of the specific peak selected in the reference value selection step and an actual measured value of a mass-to-charge ratio that corresponds to the specific peak and lies in the data acquisition range.

8. The mass spectrometry method according to claim 7 further comprising a reference sample setting step of setting a type of reference sample, wherein in the mass spectrometry analysis step, mass spectrometry analysis is performed on a to-be-measured sample that includes the reference sample set in the reference sample setting step, in the reference value selection step, from the storage unit storing, in advance, the reference values of the mass-to-charge ratios of the plurality of peaks obtained through mass spectrometry analysis performed on each of a plurality of types of reference samples, the reference values being associated with a corresponding one of the plurality of types of reference samples, reference values of mass-to-charge ratios of a plurality of peaks associated with the reference sample set in the reference sample setting step are read, and a reference value of a mass-to-charge ratio of a specific peak is selected among from the reference values thus read.

9. The mass spectrometry method according to claim 8, wherein in the reference value selection step, reference values of mass-to-charge ratios of at least two peaks are selected.

10. The mass spectrometry method according to claim 9, wherein in the reference value selection step, a reference value of a mass-to-charge ratio of at least one peak that lies in each of regions adjacent to both sides of the analysis range is selected.

* * * * *